United States Patent
Ball

(10) Patent No.: US 6,865,063 B2
(45) Date of Patent: Mar. 8, 2005

(54) INTEGRATED INRUSH CURRENT LIMITER CIRCUIT AND METHOD

(75) Inventor: Alan R. Ball, Gilbert, AZ (US)

(73) Assignee: Semiconductor Components Industries, LLC, Phoenix, AZ (US)

(*) Notice: Subject to any disclaimer, the term of this patent is extended or adjusted under 35 U.S.C. 154(b) by 325 days.

(21) Appl. No.: 10/291,015

(22) Filed: Nov. 12, 2002

(65) Prior Publication Data

US 2004/0090726 A1 May 13, 2004

(51) Int. Cl.[7] .............................................. H02H 3/00
(52) U.S. Cl. ...................................... 361/93.9; 361/58
(58) Field of Search .............................. 361/93.1, 93.2, 361/93.7, 93.8, 93.9, 58, 64, 91.1, 91.2, 90, 92, 100, 101

(56) References Cited

U.S. PATENT DOCUMENTS

| | | | | |
|---|---|---|---|---|
| 3,597,655 A | * | 8/1971 | Forte .............................. 361/56 |
| 5,105,251 A | * | 4/1992 | Nakayama .................... 257/367 |
| 5,390,069 A | * | 2/1995 | Marshall ....................... 361/103 |
| 5,488,533 A | * | 1/1996 | Cassidy ....................... 361/93.1 |
| 5,581,433 A | * | 12/1996 | Jordan ......................... 361/93.2 |
| 5,587,863 A | * | 12/1996 | Bergstrom et al. .......... 361/93.9 |
| 5,761,020 A | * | 6/1998 | Nadd ........................... 361/103 |
| 5,869,969 A | * | 2/1999 | Cividino et al. ............. 320/153 |
| 6,768,623 B1 | * | 7/2004 | Shen ............................ 361/93.9 |
| 2001/0021092 A1 | * | 9/2001 | Astala | |
| 2002/0166073 A1 | * | 11/2002 | Nguyen et al. | |

* cited by examiner

Primary Examiner—Ronald Leja
(74) Attorney, Agent, or Firm—James J. Stipanuk

(57) ABSTRACT

An inrush current limiter circuit (20) includes a mirrored transistor (50) responsive to a control signal ($V_{DRIVE}$) developed from a sense current ($I_{SENSE}$), and has a first source (51) coupled to a supply voltage, a common drain (53) that routes a load current ($I_{LOAD}$) to an output node (45), and a second source that samples the load current to produce the sense current. A fault protection circuit (64) disables the mirrored transistor in response to a first fault condition (TEMP, UVLO) and is coupled to a first lead (43) for externally adjusting a fault threshold. A fault communication circuit (250) is coupled to the first lead to receive a fault signal representative of an external fault condition to disable the mirrored transistor.

19 Claims, 4 Drawing Sheets

INTEGRATED INRUSH CURRENT LIMITER CIRCUIT AND METHOD

BACKGROUND OF THE INVENTION

The present invention relates in general to semiconductor devices and, more particularly, to high current semiconductor devices for limiting current surges on a power supply bus.

Many electronics systems are designed to allow users to insert and remove circuit cards without powering down the entire system, commonly referred to as "hot swapping". In a system where power is distributed to multiple cards on a power bus, each circuit card typically includes large filter capacitors to reduce noise on the bus, so a hot swap can produce an inrush current spike that, if not otherwise limited, reaches hundreds of amperes and which can damage the circuit card, its connector, or other circuit cards that are plugged into the system. The inrush current spikes can also produce a data loss or other system malfunction on the card being hot swapped or on other system cards. To control the deleterious effects of inrush current, hot swappable cards are configured with inrush current limiting circuits that typically include power MOSFET switches for routing load currents from the supply bus.

Circuit cards that operate at distinct current levels use unique designs and different components to implement their inrush current limiting functions. The unique designs increase the manufacturing cost of the circuit cards and the need to inventory different components makes it difficult for manufacturers of the cards and components to benefit from large economies of scale.

Hence, there is a need for an inrush current limiter that can support cards running at different current levels in order to reduce the manufacturing cost by achieving economies of scale.

DETAILED DESCRIPTION OF THE DRAWINGS

In the figures, elements having the same reference number have similar functionality.

Figure 1:
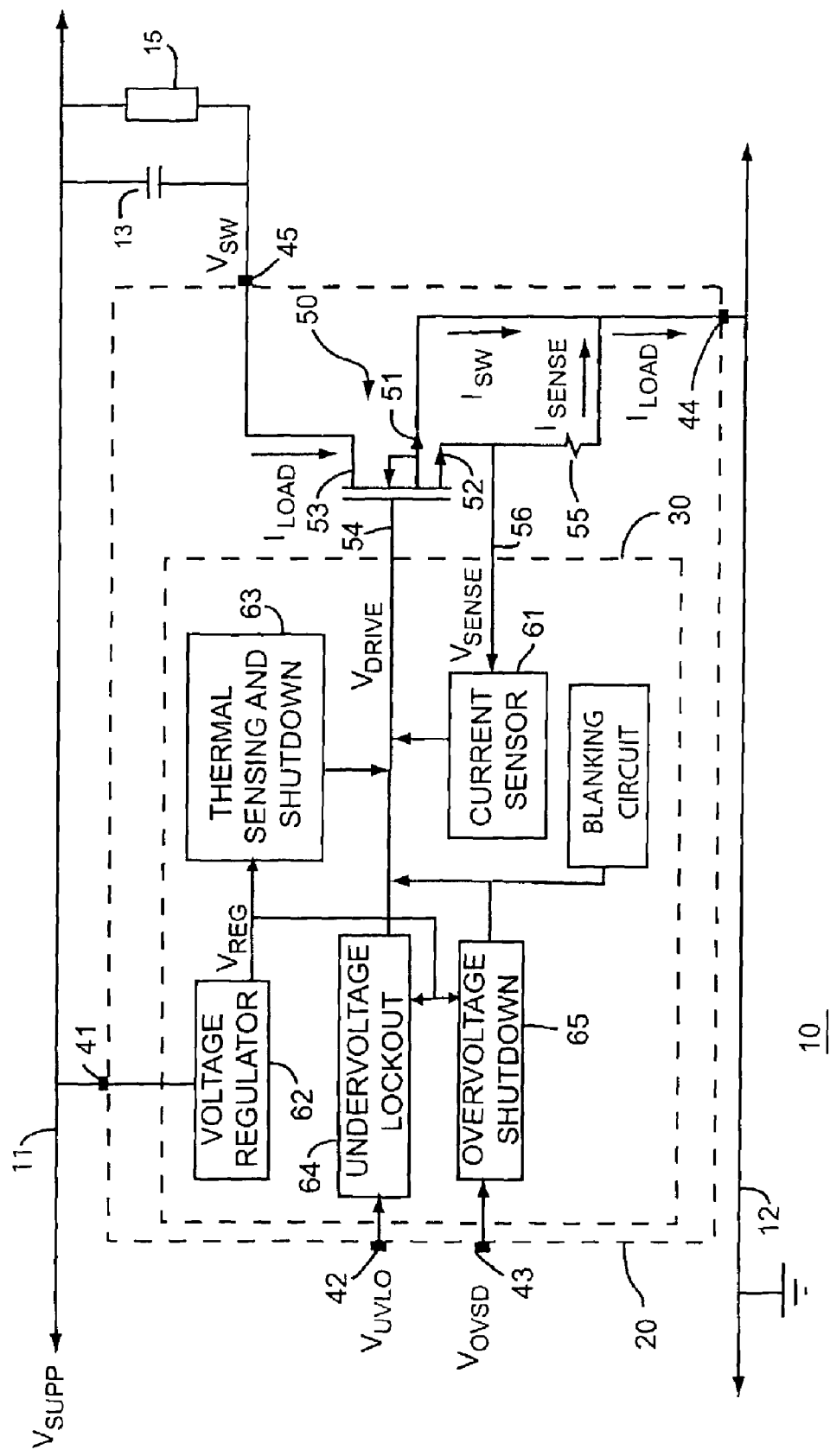
FIG. 1 is a schematic diagram of an electronic system including a hot swap card.

FIG. 1 is a simplified schematic diagram of a hot swappable circuit card 10 for plugging and/or unplugging into an distributed power bus 11 operating between a power supply voltage $V_{SUPP}$=48.0 volts and a ground node 12. Power bus 11 and ground node 12 may concurrently be supplying power to other components (not shown) of an electronic system.

A large filter capacitor 13 smooths out noise spikes on power bus 11 to provide stable biasing. A circuit that performs a function of circuit card 10 is shown as a load 15 that draws a load current $I_{LOAD}$ from power bus 11 through an inrush current limiter circuit 20. In one embodiment, load 15 includes a voltage regulator drawing a load current $I_{LOAD}$=10.0 amperes as a peak value through capacitor 13 and load 15. A typical average value of $I_{LOAD}$ is about four amperes. In one embodiment, capacitor 13 has a value of about one thousand microfarads. When circuit card is hot swapped, current $I_{LOAD}$ flows into capacitor 13 to charge it to the value of $V_{SUPP}$. Inrush current limiter circuit 20 limits the peak value of $I_{LOAD}$, which could otherwise reach one hundred amperes or more, to a specified value. In one embodiment, $I_{LOAD}$ is limited to about ten amperes.

Inrush current limiter 20 includes a detection circuit 30 that controls a mirrored power transistor 50 through which load current $I_{LOAD}$ is routed to capacitor 13 and load 15. In one embodiment, inrush current limiter 20 is formed on a semiconductor substrate as an integrated circuit having five external package leads 41–45.

Mirrored transistor 50 is formed as a vertical power MOSFET transistor having a power source 51, a sensing source 52, a common drain 53 and a common gate 54. Power source 51 and sensing source 52 are mirrored or scaled to conduct proportional components $I_{SW}$ and $I_{SENSE}$, respectively, of $I_{LOAD}$ In one embodiment, transistor 50 has a gate to source conduction threshold of about one volt. In one embodiment, the effective sizes of power source 51 and sensing source 52 are scaled in a ratio of 1000:1, so peak values of current $I_{SW}$=9.990 amperes and $I_{SENSE}$=10.0 milliamperes, approximately, when $I_{LOAD}$=10.0 amperes.

An integrated sense resistor 55 is coupled in series with sensing source 52 to develop a sense voltage $V_{SENSE}$ with sensing current $I_{SENSE}$ at a node 56. In one embodiment, resistor 55 has a resistance of about ten ohms, so $V_{SENSE}$ has a value of about one hundred millivolts and a corresponding power dissipation of about one milliwatt when $I_{SENSE}$=10.0 milliamperes.

Detection circuit 30 includes a current sensor 61, a voltage regulator 62, and a number of fault detection and prevention circuits such as a thermal fault shutdown circuit 63, an undervoltage lockout circuit 64, an overvoltage shutdown circuit 65 and a blanking circuit 66.

Voltage regulator 62 is configured as a standard shunt regulator coupled between ground lead 41 and power supply lead 44 to provide an internal supply voltage $V_{REG}$ for biasing detection circuit 30.

Current sensor 61 indirectly senses $I_{LOAD}$ with an error amplifier that receives $V_{SENSE}$ as a feedback signal and produces a representative drive control signal $V_{DRIVE}$ at gate 54. In effect, current sensor 61 operates by routing a scaled portion of $I_{LOAD}$ through sensing source 52 as $I_{SENSE}$ and adjusts $V_{DRIVE}$ to limit the magnitude of load current $I_{LOAD}$ to a predetermined maximum value of, e.g., ten amperes.

The operation of inrush current limiter 20 proceeds as follows. During a hot swap insertion of circuit card 10, capacitor 13 is substantially discharged and an output voltage $V_{SW}$ is produced on drain 53 at nearly the level of $V_{SUPP}$. Capacitor 13 presents a low impedance load to inrush current limiter 20, which in response supplies the maximum predetermined value of $I_{LOAD}$, for example, ten amperes, to charge capacitor 13. In effect, transistor 50 operates as a constant current source until capacitor 13 is charged to $V_{SUPP}$, at which point $V_{DRIVE}$ is increased to the $V_{REG}$ level and mirrored transistor 50 is in a fully conducting state. Because of the current limiting feature, excessive loading of supply voltage $V_{SUPP}$ is avoided, so output voltage $V_{SW}$ is referred to as a protection signal.

Load current $I_{LOAD}$ is sampled with a low-valued sense current $I_{SENSE}$, rather than being sensed directly, so only a small amount of power is dissipated through sense resistor 55, thereby providing a high efficiency. Moreover, the external component count is reduced because resistor 55 is readily integrated on the same die as other components of inrush current limiter 20, which reduces the overall cost of circuit card 10.

An undervoltage fault condition occurs when supply voltage $V_{SUPP}$ is less than its specified range. This fault condition is sensed and protected by undervoltage lockout circuit 64, which includes a threshold comparator that senses the magnitude of supply voltage $V_{SUPP}$ and maintains transistor 50 in an off state until $V_{SUPP}$ rises above an undervoltage fault threshold level. The undervoltage threshold level is set with an internal voltage divider coupled to lead 42 to provide a divided voltage $V_{UVLO}$ from $V_{SUPP}$ that can be adjusted with one or more external resistors if desired. A digital undervoltage shutdown signal UVLO drives an open drain output stage that pulls gate 54 down to approximately ground potential to disable transistor 50 when an undervoltage fault condition is detected. Hysteresis circuitry is then enabled to maintain transistor 50 in an off state until $V_{SUPP}$ rises above a higher threshold level, thereby preventing rapid cycling and/or oscillations. In one embodiment, where $V_{SUPP}$ operates at forty-eight volts, the undervoltage fault threshold level is set to a value of about thirty-two volts.

An overvoltage fault condition occurs when supply voltage $V_{SUPP}$ exceeds an overvoltage fault threshold level. This fault condition is sensed and protected by overvoltage shutdown circuit 65, which operates on a fashion similar to that of undervoltage lockout circuit 64, except that a threshold comparator disables detection circuit 30 and transistor 50 if $V_{SUPP}$ rises above the overvoltage fault threshold level, which is set with an internal voltage divider that produces a divided voltage $V_{OVSD}$ from $V_{SUPP}$ at lead 43 that can be adjusted with one or more external resistors. A digital shutdown signal OVSD drives an open drain output stage that pulls gate 54 down to approximately ground potential to disable transistor 50 when an overvoltage fault condition is detected. Hysteresis circuitry maintains transistor 50 in an off state until $V_{SUPP}$ falls below a lower threshold level to prevent rapid cycling and/or oscillations. In one embodiment, where $V_{SUPP}$ operates at forty-eight volts, the overvoltage fault threshold level is set to be about ninety-five volts and the lower threshold level is set to a value of about ninety volts.

An overtemperature or thermal fault condition is detected and protected by thermal fault shutdown circuit 63 that includes a temperature sensor formed on the same semiconductor substrate as detection circuit 30 and mirrored transistor 50. The temperature sensor circuitry preferably is disposed adjacent to power source 51 or embedded within the layout of transistor 50, i.e., close to where the most heat is being generated, in order to sense the temperature of the hottest portion of inrush current limiter 20. When a thermal fault condition is detected, a digital thermal fault shutdown signal TEMP is produced to drive an open drain output stage that pulls gate 54 down to approximately ground potential to disable transistor 50. Temperature hysteresis circuitry ensures that mirrored transistor 50 remains turned off until the temperature falls below a lower threshold temperature. In one embodiment, the upper threshold temperature is about one hundred eighty degrees Celsius and the lower threshold temperature is about one hundred seventy degrees Celsius.

Blanking circuit 66 includes a resistor-capacitor network to set a time constant that maintains inrush current limiter 20 and transistor 50 in an off state for a delay period after a hot swap card insertion. This startup delay avoids a startup malfunction by allowing internal nodes to stabilize before circuit card 10 receives power through inrush current limiter 20. An output has an open drain configuration that switches gate 54 to ground potential during the startup delay. In one embodiment, the delay period is about two microseconds.

Figure 2:
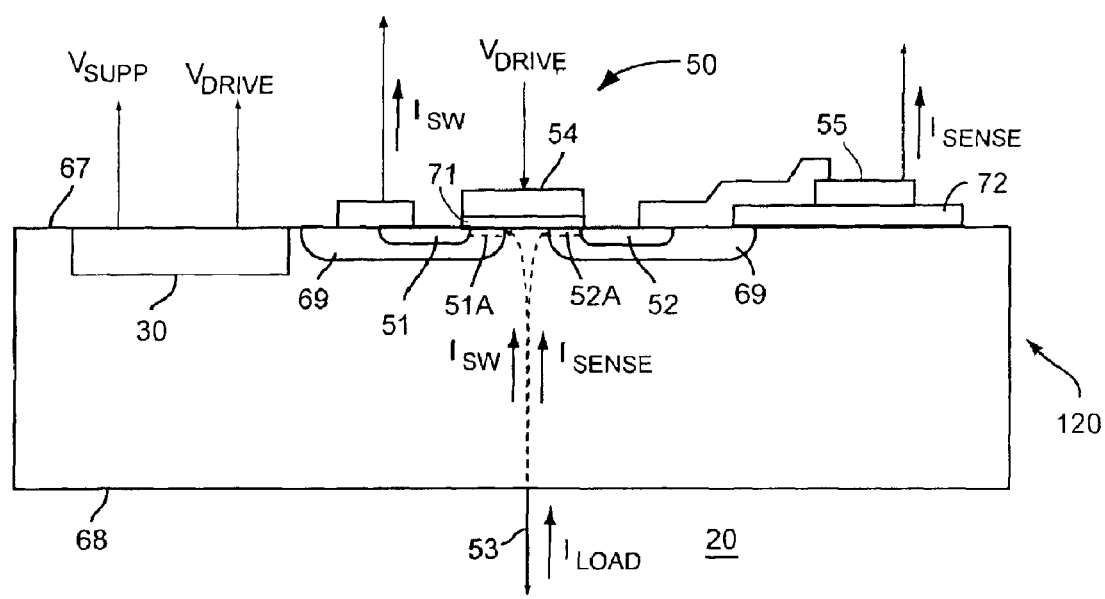
FIG. 2 is a cross-sectional view of an inrush current limiter circuit formed on a semiconductor substrate.

FIG. 2 is a simplified cross sectional view of inrush current limiter 20 formed on a semiconductor substrate 120 as an integrated circuit including transistor 50, resistor 55 and detection circuit 30.

Transistor 50 is implemented as a vertical device to achieve a small die area. Hence, sources 51-52 are formed as n-type doped regions within p-type well regions 69 on a top surface 67 of substrate 120. Common gate 54 is formed over a gate oxide layer 71 to control the conduction of an underlying power channel 51A and sense channel 51B along top surface 67 within well regions 69 operating at ground potential and coupled together out of the view plane of FIG. 2. Note that although sources 51 and 52 are shown as having a similar size in the figure, source 52 typically is scaled to a much smaller effective size than source 51. Drain 53 is formed on a second surface 68 of substrate 120 so that currents $I_{SW}$ and $I_{SENSE}$ flow from surface 67 through channels 51A and 52A, respectively, and through substrate 120 to drain 53 at second surface 68 as shown. The vertical structure of transistor 50 provides a low on-resistance and a small die size, resulting in a high performance and low fabrication cost.

Resistor 55 is formed on surface 67. In one embodiment, resistor 55 is formed by depositing and patterning a polysilicon layer over a dielectric layer 72 as shown.

Detection circuit 30 components are also formed on surface 67 and may or may not underlie resistor 55. Transistors are formed in one or more well regions that may be distinct from well regions 69. The temperature sensor in thermal fault shutdown circuit 63 is formed in close proximity to transistor 50, where the highest level of heat is generated, to sense the temperature of substrate 120 accurately.

Figure 3:
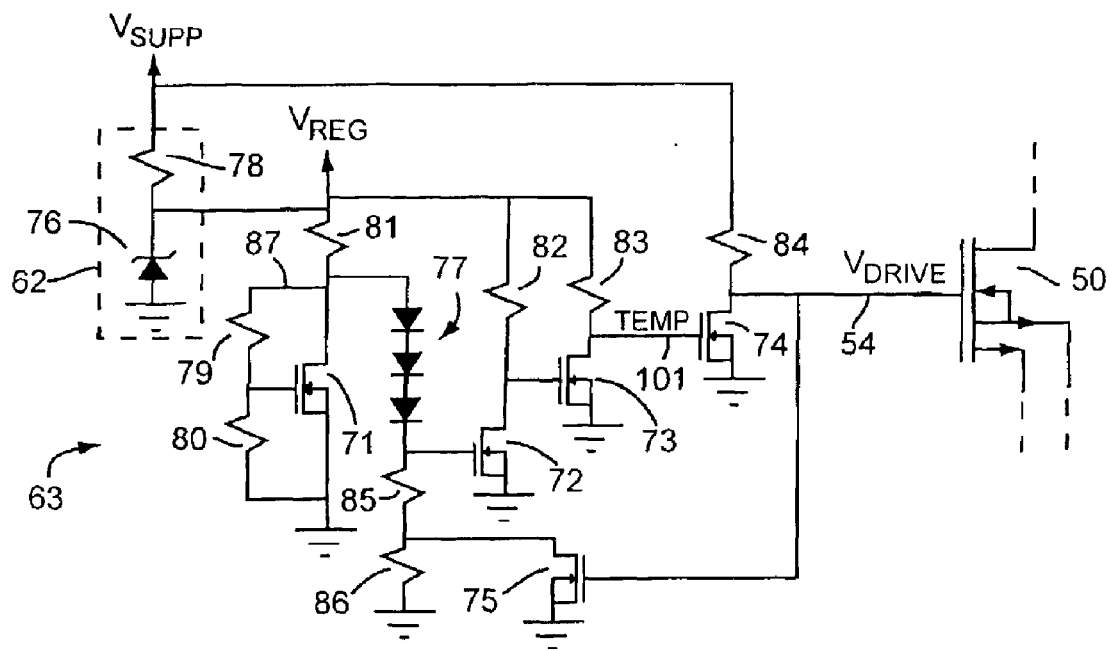
FIG. 3 is a schematic diagram showing a detail of the inrush current limiter including a shunt regulator and a thermal sensing and shutdown circuit.

FIG. 3 is a schematic diagram showing voltage regulator 62 and thermal fault shutdown circuit 63 in further detail, including transistors 71–75, zener diode 76, a diode string 77 and resistors 79–86.

Voltage regulator 62 operates as a shunt regulator developing an internal regulated voltage $V_{REG}$=12.0 volts, approximately, across zener diode 76. Zener diode 76 has a positive temperature coefficient of voltage.

Transistor 71 and resistors 79–80 comprise a shunt regulator that establishes a voltage $V_{87}$ at a node 87 that has a negative temperature coefficient of voltage. In one embodiment, $V_{87}$=2.7 volts when the substrate 120 temperature is twenty-five degrees Celsius. The voltage dropped across diode string 77 decreases with temperature, so the voltage at the gate of transistor 72 increases with temperature.

Transistors 72–73 combine with resistors 82–83 to function as a two stage amplifier that produces thermal fault shutdown signal TEMP on a node 101. Resistor 84 is used to establish a high voltage on gate 54 that turns on transistor 50 when no fault condition is detected. Transistor 74 operates as the open drain output stage driving gate 54. When the thermal fault temperature threshold of substrate 120 is exceeded, TEMP is at a logic high level about equal to the level of $V_{REG}$, turning on transistor 74 and switching gate 54 to about ground potential to turn off transistor 50. In one embodiment, the thermal shutdown temperature is set at about one hundred eighty degrees Celsius. Transistor 75 and resistors 85–86 provide temperature hysteresis of about ten degrees Celsius to prevent thermal oscillations.

Figure 4:
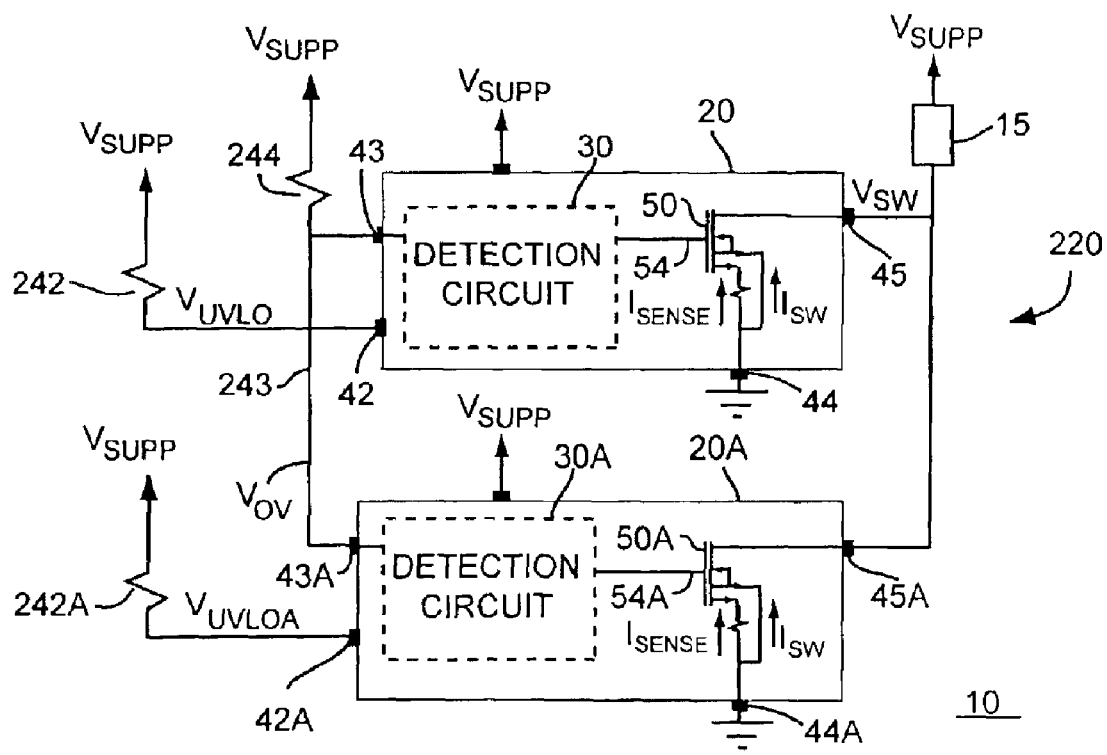
FIG. 4 is a schematic diagram of a hot swappable circuit card protected by an inrush current limiting network.

FIG. 4 is a simplified schematic diagram of hot swappable circuit card 10 in an alternate embodiment including protection by an inrush current limiting network 220 at a higher level of load current $I_{LOAD}$. Inrush current limiting network 220 is formed with inrush current limiter 20 coupled to a similarly configured inrush current limiter 20A as shown. In an embodiment in which inrush current limiters 20 and 20A are configured with a ten ampere load current limit, inrush current limiting network 220 increases the limit of load current $I_{LOAD}$ to about twenty amperes. To simplify the description, reference numbers for elements of inrush current limiter 20A have an "A" appended to show the correspondence to similarly numbered elements of inrush current limiter 20.

The higher current limit is achieved by coupling mirrored transistors 50 and 50A together in a quasi-parallel arrangement in which their respective common drains are connected together via leads 45 and 45A, while their respective sources are coupled to ground potential as shown.

Regarding inrush current limiter 20, an undervoltage fault condition is protected and detected as described above, with the undervoltage threshold level represented by divided voltage $V_{UVLO}$ on lead 42 and modified by an external resistor 242 if desired. Similarly, for inrush current limiter 20A, an undervoltage threshold level is represented by a divided voltage $V_{UVLOA}$ provided on a lead 42A and modified by an external resistor 242A. Divided voltages $V_{UVLO}$ and $V_{UVLOA}$ typically are set to about the same voltage level.

Overvoltage fault conditions are detected and protected by inrush current limiters 20 and 20A in a fashion similar to that described above, except that leads 43 and 43A are connected together at a node 243 so that the respective internal voltage dividers are coupled in parallel to provide a common divided voltage $V_{OV}$. Where inrush current limiters 20 and 20A are formed as similar integrated circuits, $V_{OV}$ has a value nearly identical to the value of the divided voltage, e.g., $V_{OVSD}$, of inrush current limiter 20, as described above. In the embodiment shown in FIG. 4, divided voltage $V_{OV}$ is modified from its internal voltage divided value by the addition of resistor 244.

As a feature of the invention, leads 43 and 43A have a dual function that allows for fault information to be communicated from inrush current limiter 20 to inrush current limiter 20A and vice versa. To accomplish such fault communication, inrush current limiter 20 includes a fault communication circuit that has an output stage configured with an open drain output transistor coupled to lead 43. During normal operation, the output transistor is turned off and overvoltage sensing proceeds as described above. However, during a fault condition, the output transistor turns on and the open drain switches lead 43, as well as node 243 and lead 43A, to about ground potential. When lead 43A is at ground potential, the fault communication circuit in inrush current limiter 20A responds by turning off transistor 50A, thereby providing concurrent protection that avoids a load current overload condition. Such a current overload could cause system latchup problems due to all of the current being transferred to the remaining operating device.

Inrush current limiter 20A has a similarly configured output transistor with an open drain connected to lead 43A, and therefore can communicate a detected fault condition to inrush current limiter 20 in a similar fashion. Hence, when any inrush current limiter in a network detects a fault condition, the fault is communicated to all of the other inrush current limiters in the network, which then shut themselves down to avoid system latchup. This scheme results in a high level of reliability, which can be further enhanced by adding one or more redundant inrush current limiters controlled by external logic circuitry. In the event a fault condition is detected by one inrush current limiter, such as an overtemperature fault condition, the external circuitry can use the fault information to enable one of the redundant inrush current limiters to operate in place of the one with the fault condition.

Although shown and described as having two inrush current limiters 20 and 20A, network 220 may alternatively be formed with virtually any number of individual inrush current limiters connected in a similar quasi-parallel fashion to extend the load current limit to a wide range of values. This technique allows a circuit card manufacturer to select an appropriate number of integrated inrush current limiters to implement a particular current limit for a particular design. This allows heat to be dissipated over multiple devices, which reduces the operating temperature of each device, thereby improving reliability. In addition, the manufacturer achieves the benefits of a larger economy of scale, which results in a lower fabrication cost. Moreover, the design cycle for the inrush current limiting function is reduced, further reducing the cycle time and cost.

Note that inrush current limiters 20 and 20A are shown as being formed as individual integrated circuits on separate semiconductor substrates housed in separate semiconductor packages. In an alternate embodiment, inrush current limiters 20 and 20A may be formed on different substrates and housed in the same package. In yet another alternate embodiment, inrush current limiters 20 and 20A may be formed on the same semiconductor substrate and housed in a single package.

Figure 5:
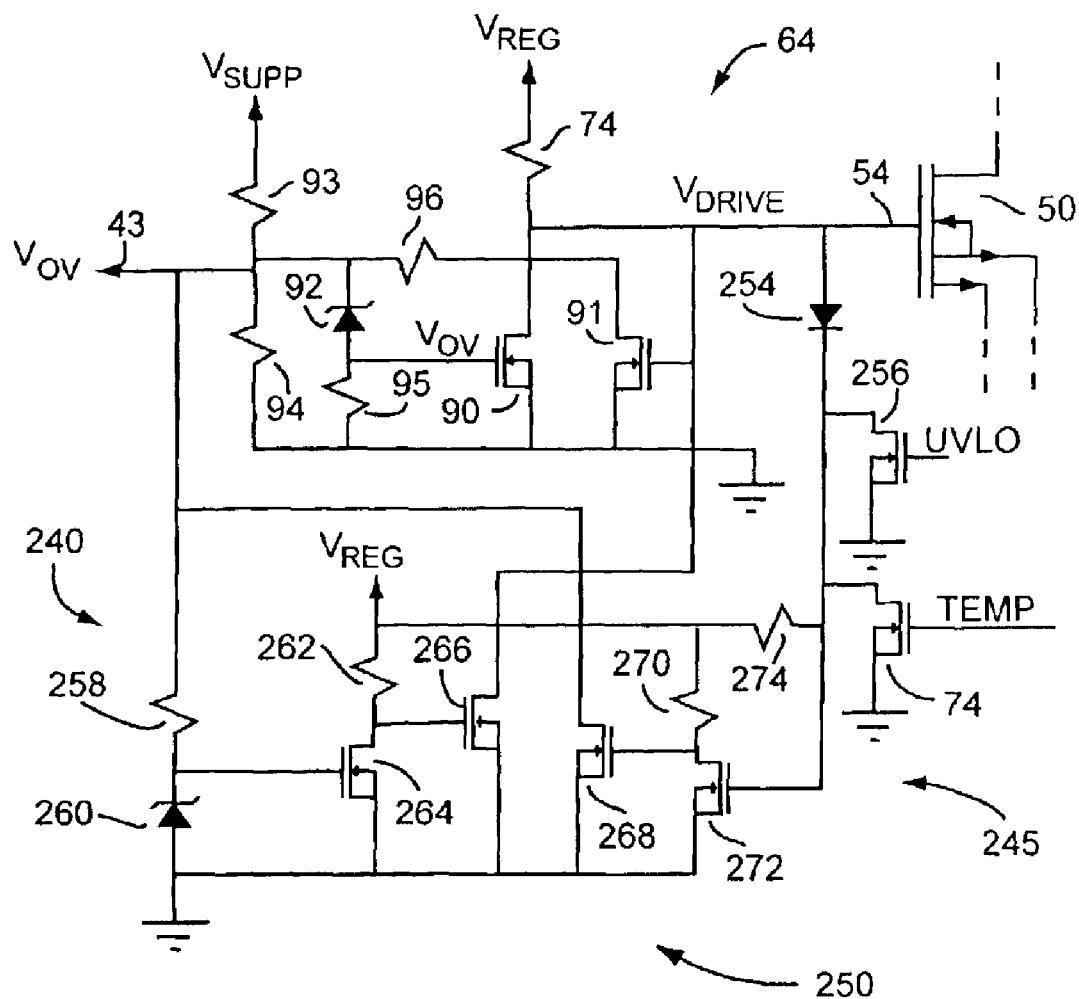
FIG. 5 is a schematic diagram of a portion of the inrush current limiter circuit including an overvoltage circuit and a fault communication circuit.

FIG. 5 is a schematic diagram showing a portion of inrush current limiter 20 in further detail, including overvoltage shutdown circuit 65 and a fault communication circuit 250.

Overvoltage shutdown circuit 65 includes resistors 93–94, which operate as a voltage divider that divides supply voltage $V_{SUPP}$ to provide divided voltage $V_{OVSD}$ at lead 43. A zener diode 92 level shifts $V_{OVSD}$ to control a transistor 90. An overvoltage fault condition occurs when $V_{SUPP}$ exceeds a predetermined voltage, at which point transistor 90 turns on to switch gate 54 to ground potential, turning off transistor 50 and disabling inrush current limiter 20. Transistor 91 switches resistor 96 in parallel with resistor 94 to provide a voltage hysteresis that avoids oscillations and/or false triggering on gate 50 due to $V_{SUPP}$ noise. In one embodiment, an overvoltage fault condition occurs when $V_{SUPP}$ reaches an overvoltage threshold of about ninety-five volts, with about five volts of hysteresis. Lead 43 provides an external connection for adjusting the overvoltage threshold level with an external resistor.

Transistor 74 is the open drain output transistor of thermal fault shutdown circuit 63, which is switched on in response to overtemperature shutdown signal TEMP. A transistor 256 is the open drain output transistor of undervoltage lockout circuit 64, which is switched on to turn off transistor 50 in response to undervoltage lockout signal UVLO.

As described above, lead 43 is used both to adjust the overvoltage threshold and to communicate, i.e., send and receive, information regarding fault conditions. Fault information is processed by fault communication circuit 250, which includes a receiver 240 and a transmitter 245.

Transmitter 245 has an input coupled through a blocking diode 254 to gate 54, and includes resistors 270 and 274 and transistors 268 and 272. In an application in which $V_{SUPP}$=48.0 volts, and when there is no fault condition, divided voltage $V_{OV}$ operates at about six volts and gate 54 operates at about the potential of $V_{REG}$=12.0 volts. Hence, transistor 272 is on and transistor 268 is off. Transistor 268 operates as an open drain output device providing fault information on lead 43. When an internal fault condition is detected, gate 54 is pulled to ground potential by, e.g., transistor 74 and/or transistor 256, and transistor 272 is turned off. Transistor 268 is turned on to switch lead 43 to ground potential, or nearly so. Lead 43 normally operates at a voltage $V_{OV}$ of several volts, and its transition to about ground potential is outside the normal range of operation of inrush current limiter 20. Hence, the invention uses an out-of-range voltage level, e.g., ground potential, to provide fault information externally regarding internally detected fault conditions.

Receiver 240 has an input on lead 43 for receiving and processing fault information generated externally by other inrush current limiters, and includes resistors 258 and 262, a zener diode 260 and transistors 264 and 266. During normal operation, divided voltage $V_{OV}$ operates at about six volts, so transistor 264 is on and transistor 266 is off. When an external fault condition is detected by another networked inrush current limiter, lead 43 is switched to about ground potential, which turns off transistor 264 and turns on transistor 266. Since transistor 266 functions as an open drain output device, gate 54 is switched to ground potential to turn off mirrored transistor 50. As a result, a fault condition detected in one of multiply connected inrush current limiters shuts down all of the inrush current limiters in the network.

In summary, the present invention provides an inrush current limiter integrated circuit that has a high reliability and a low cost by using a package lead both to adjust a fault threshold and to transfer information regarding fault conditions. A mirrored transistor operates in response to a control signal developed from a sense current. A first source of the mirrored transistor receives a supply voltage, a common drain routes a load current of the supply voltage to an output node, and a second source samples the load current to produce the sense current. A first fault protection circuit is coupled to a lead to externally adjust a fault threshold, and disables the mirrored transistor when a fault condition occurs. A second fault protection circuit disables the mirrored transistor in response to a fault condition and produces a shutdown signal at the first lead.

This arrangement allows multiple inrush current limiter integrated circuits to be networked in a quasi-parallel fashion to provide a larger current capability than would be practical for an individual integrated circuit. Fault information is communicated among the networked circuits without increasing the number of leads or significantly increasing the cost of the individual inrush current limiter integrated circuits. Hence, a low fabrication cost and high reliability are achieved. Moreover, system manufacturers can carry an inventory of a single type of inrush current limiter and produce hot swap cards or other subsystems that cover a broad range of current capabilities by connecting multiple devices as described. Accordingly, the technique of the invention allows larger economies of scale, which further reduces the manufacturing cost.

What is claimed is:

1. An inrush current limiter circuit, comprising:
   a mirrored transistor operating in response to a control signal developed from a sense current, and having a first source coupled to a supply voltage, a common drain for routing a load current of the supply voltage to an output node, and a second source for sampling the load current to produce the sense current;
   a fault protection circuit for disabling the mirrored transistor in response to a first fault condition and coupled to a first lead of the inrush current limiter circuit for adjusting a fault threshold of the first fault condition; and
   a fault communication circuit coupled to the first lead for receiving a fault signal representative of an external fault condition to disable the mirrored transistor.

2. The inrush current limiter of claim 1, wherein the fault communication circuit produces a shutdown signal at the first lead in response to the first fault condition.

3. The inrush current limiter circuit of claim 1, wherein the first fault condition occurs when the supply voltage is greater than an overvoltage threshold and the first lead operates at a potential derived from the supply voltage.

4. The inrush current limiter circuit of claim 1, further comprising a semiconductor substrate having a first surface for forming the fault protection circuit and a second surface for forming the common drain of the mirrored transistor.

5. The inrush current limiter circuit of claim 4, further comprising a detection circuit that includes:
   the fault protection circuit; and
   a thermal sensor formed on the semiconductor substrate to monitor a second fault condition as a temperature of the mirrored transistor.

6. The inrush current limiter circuit of claim 5, wherein the thermal sensor produces a shutdown signal when the temperature of the semiconductor substrate is higher than a predefined temperature threshold.

7. The inrush current limiter circuit of claim 4, wherein the mirrored transistor has a common gate overlying the first surface of the semiconductor substrate.

8. The inrush current limiter circuit of claim 7, further comprising a resistor coupled between the second source and a power supply node for developing a detection signal with the sense current.

9. The inrush current limiter of claim 8, wherein the resistor is formed from a polysilicon layer overlying the semiconductor substrate.

10. The inrush current limiter of claim 9, further comprising a current sensor having an input coupled to the second source for receiving the detection signal and an output coupled to the common gate for providing the control signal.

11. The inrush current limiter circuit of claim 1, further comprising an undervoltage detector coupled to a second lead of the inrush current limiter circuit for monitoring the supply voltage.

12. The inrush current limiter circuit of claim 11, wherein the undervoltage detector detects a second fault condition as the supply voltage being less than an undervoltage threshold.

13. The inrush current limiter of claim 1, wherein the first source of the mirrored transistor has an effective size at least five hundred times an effective size of the second source.

14. The inrush current limiter circuit of claim 1, wherein the mirrored transistor supplies at least ten amperes of load current.

15. An inrush current limiter, comprising:
   a first mirrored transistor having a common gate for receiving operating in response to a control signal, and having a power source coupled to a supply voltage, a common drain for supplying a load current, and a sensing source for sampling the load current to produce a sense current;

a first detection circuit coupled for disabling the first mirrored transistor when the supply voltage is greater than a first overvoltage threshold, and having an input coupled to a first lead of the inrush current limiter for externally modifying the first overvoltage threshold; and a first fault protection circuit for disabling the first mirrored transistor in response to a fault condition and coupled to the first lead for producing a shutdown signal.

16. The inrush current limiter of claim 15, further comprising a first semiconductor substrate having a first surface for forming the first detection circuit and the first fault protection circuit and a second surface for forming the common drain of the first mirrored transistor.

17. The inrush current limiter of claim 16, further comprising:

a second semiconductor substrate; and a second mirrored transistor having power and sensing sources formed on a first surface of the second semiconductor substrate and respectively coupled to the power and sense sources of the first mirrored transistor, and a common drain formed on a second surface of the second semiconductor substrate.

18. The inrush current limiter of claim 17, further comprising:

a second detection circuit formed on the first surface of the second semiconductor substrate for disabling the second mirrored transistor when the supply voltage is greater than a second overvoltage threshold, and having an input coupled to a third lead of the inrush current limiter circuit for externally modifying the second overvoltage threshold; and a second fault protection circuit having an input coupled to the first lead for disabling the second mirrored transistor with the shutdown signal.

19. The inrush current limiter of claim 18, wherein the detection signal adjusts an amplitude of the control signal to limit the load current to a predetermined value.

* * * * *